United States Patent
Kirchhoffer

(10) Patent No.: US 10,605,335 B2
(45) Date of Patent: Mar. 31, 2020

(54) DUAL CLUTCH TRANSMISSION FOR MOTOR VEHICLES

(71) Applicant: FORD GLOBAL TECHNOLOGIES, LLC, Dearborn, MI (US)

(72) Inventor: Johann Kirchhoffer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 15/433,911

(22) Filed: Feb. 15, 2017

(65) Prior Publication Data
US 2017/0248202 A1    Aug. 31, 2017

(30) Foreign Application Priority Data
Feb. 25, 2016    (DE) .......................... 10 2016 202 915

(51) Int. Cl.
*F16H 3/00*    (2006.01)
*F16H 3/093*    (2006.01)
*F16H 3/08*    (2006.01)

(52) U.S. Cl.
CPC ............. *F16H 3/093* (2013.01); *F16H 3/006* (2013.01); *F16H 2003/008* (2013.01);
(Continued)

(58) Field of Classification Search
CPC .... F16H 3/093; F16H 3/006; F16H 2003/008; F16H 2003/0826; F16H 2003/0931; F16H 2200/0073; F16H 2200/0086
See application file for complete search history.

(56) References Cited

U.S. PATENT DOCUMENTS 6,591,705 B1 *    7/2003    Reik ................... B60W 10/02
74/343
7,246,536 B2    7/2007    Baldwin
(Continued)

FOREIGN PATENT DOCUMENTS

DE    202009005634 U1    9/2010
DE    202009005634 U1    10/2010
(Continued)

OTHER PUBLICATIONS

German Search Report dated Dec. 12, 2016 in corresponding German Patent Application No. 102016202915.0, 7 pages.

*Primary Examiner* — Zakaria Elahmadi
(74) *Attorney, Agent, or Firm* — Vincent Mastrogiacomo; Brooks Kushman P.C.

(57) ABSTRACT

A dual clutch transmission for motor vehicles has first and second input shafts, two clutches selectively coupling the input shafts the engine, two intermediate shafts arranged parallel to the transmission input shafts, gearwheel pairs configured to transmit power between the input shafts and the intermediate shafts, and output gearwheels arranged on each of the two intermediate shafts. The output gearwheels mesh with the differential wheel and are selectively coupled to the respective intermediate shaft by one of the coupling devices. An additional intermediate gearwheel set is provided, that one gearwheel of the intermediate gearwheel set is seated on the first or second intermediate shaft, that the other gearwheel of the inter-mediate wheel set is arranged on a third intermediate shaft, and that a third output gearwheel, which meshes with one of the output gearwheels of the first or second intermediate shaft, is seated on the third intermediate shaft.

13 Claims, 15 Drawing Sheets

(52) U.S. Cl.
CPC ............... *F16H 2003/0826* (2013.01); *F16H 2003/0931* (2013.01); *F16H 2200/0073* (2013.01); *F16H 2200/0086* (2013.01)

(56) References Cited

U.S. PATENT DOCUMENTS

| | | | | |
|---|---|---|---|---|
| 7,340,973 | B2* | 3/2008 | Hiraiwa | F16D 21/04 |
| | | | | 74/330 |
| 8,166,842 | B2 | 5/2012 | Rieger | |
| 8,757,020 | B2 | 6/2014 | Singh et al. | |
| 8,757,021 | B2* | 6/2014 | Singh | F16H 3/006 |
| | | | | 74/330 |
| 9,003,905 | B1* | 4/2015 | Lee | F16H 3/093 |
| | | | | 74/330 |
| 9,014,932 | B2 | 4/2015 | Nemoto | |
| 9,239,096 | B2 | 1/2016 | Noh et al. | |
| 9,297,443 | B2* | 3/2016 | Lee | F16H 3/006 |
| 2006/0266141 | A1* | 11/2006 | Ogami | F16H 3/006 |
| | | | | 74/325 |
| 2007/0240530 | A1* | 10/2007 | Ogami | F16H 63/18 |
| | | | | 74/330 |
| 2008/0202266 | A1 | 8/2008 | Hendrickson et al. | |
| 2008/0245166 | A1* | 10/2008 | Baldwin | F16H 3/006 |
| | | | | 74/331 |
| 2010/0218627 | A1* | 9/2010 | Rieger | F16H 3/006 |
| | | | | 74/331 |
| 2010/0257952 | A1 | 10/2010 | Rieger et al. | |
| 2010/0257953 | A1 | 10/2010 | Rieger et al. | |
| 2010/0257958 | A1 | 10/2010 | Rieger et al. | |
| 2010/0257966 | A1 | 10/2010 | Rieger et al. | |
| 2010/0282019 | A1* | 11/2010 | Rieger | F16H 3/006 |
| | | | | 74/665 D |
| 2011/0048168 | A1* | 3/2011 | Mohlin | F16H 3/006 |
| | | | | 74/665 S |
| 2011/0185847 | A1 | 8/2011 | Tanba et al. | |
| 2011/0218716 | A1* | 9/2011 | Olsson | F16H 3/006 |
| | | | | 701/51 |
| 2013/0031989 | A1* | 2/2013 | Singh | F16H 3/006 |
| | | | | 74/330 |
| 2013/0275684 | A1 | 10/2013 | Tuck et al. | |
| 2013/0345018 | A1* | 12/2013 | Kaltenbach | B60K 6/48 |
| | | | | 477/5 |
| 2015/0298535 | A1* | 10/2015 | Luehrs | B60K 6/365 |
| | | | | 477/3 |
| 2015/0345603 | A1* | 12/2015 | Kaltenbach | F16H 37/046 |
| | | | | 74/661 |
| 2016/0010725 | A1* | 1/2016 | Wittkopp | F16H 3/093 |
| | | | | 74/330 |
| 2016/0146320 | A1* | 5/2016 | Mordukhovich | F16H 3/097 |
| | | | | 475/207 |
| 2016/0167502 | A1* | 6/2016 | Choi | B60K 6/365 |
| | | | | 475/5 |
| 2016/0207392 | A1* | 7/2016 | Zhang | F16H 3/006 |
| 2016/0298733 | A1* | 10/2016 | Bender | F16H 3/006 |
| 2017/0305260 | A1* | 10/2017 | Ruan | B60K 6/36 |

FOREIGN PATENT DOCUMENTS

| | | |
|---|---|---|
| DE | 102010053130 A1 | 5/2012 |
| DE | 102013201387 A1 | 10/2013 |
| DE | 102013106896 B4 | 1/2015 |
| DE | 102013216384 A1 | 2/2015 |
| DE | 102013216385 A1 | 2/2015 |
| DE | 102131216387 A1 | 2/2015 |
| DE | 102013019120 A1 | 5/2015 |
| DE | 102013019132 A1 | 5/2015 |
| FR | 2976039 A3 | 12/2012 |
| KR | 101500390 B1 | 3/2015 |
| WO | 2012084250 A1 | 6/2012 |

* cited by examiner

| Clutches 1=closed 0=open | | Position of coupling device (L=left/R=right/O=neutral) - Fig 1 | | | | | | gears |
|---|---|---|---|---|---|---|---|---|
| K1 (2) | K2 (3) | CD (35) | CD (20) | CD (16) | CD (18) | CD (22) | CD (27) | |
| 1 | 0 | R | R | R | O | R | O | 1 |
| 0 | 1 | R | O | R | R | O | R | 2 |
| 1 | 0 | R | O | O | O | O | R | 3 |
| 0 | 1 | O | O | O | L | L | O | 4 |
| 1 | 0 | O | O | L | L | O | O | 5 |
| 0 | 1 | O | O | R | O | R | O | 6 |
| 1 | 0 | O | R | O | R | R | O | 7 |
| 0 | 1 | O | R | L | O | O | R | 8 |
| 1 | 0 | R | R | L | L | L | R | 9 |
| 0 | 1 | R | R | L | O | O | O | 10 |
| 0 | 1 | L | L | O | O | R | O | 11 |
| 1 | 0 | L | O | O | O | R | O | R1 |
| 0 | 1 | L | O | O | O | L | R | R2 |

Fig. 15

DUAL CLUTCH TRANSMISSION FOR MOTOR VEHICLES

CROSS-REFERENCE TO RELATED APPLICATIONS

This application claims foreign priority benefit under 35 U.S.C. § 119(a)-(d) to DE 10 2016 202 915.0 filed Feb. 25, 2016, the disclosure of which is hereby incorporated in its entirety by reference herein.

TECHNICAL FIELD

The invention relates to a dual clutch transmission for motor vehicles having a first input shaft and a second input shaft, two clutches, by means of which the first input shaft and the second input shaft can be selectively coupled to the engine, two intermediate shafts arranged parallel to the transmission input shafts, gearwheel pairs of fixed wheels and freely rotating wheels, of which a first gearwheel is arranged on one of the input shafts and a second gearwheel is arranged on one of the intermediate shafts, coupling devices, by means of which the freely rotating wheels can be selectively connected to the respective intermediate shaft, and an output gearwheel arranged on each of the two intermediate shafts, wherein the output gearwheels of both intermediate shafts mesh with the differential wheel and can each be alternately connected for conjoint rotation to the respective intermediate shaft by means of one of the coupling devices.

BACKGROUND

There is an effort in the automotive industry to adapt the operating state of the engine in an optimum manner, during driving, to the current driving state of the motor vehicle in order to reduce emissions. This can be accomplished, for example, if the transmission has a large number of gears. In this case, selection is performed in such a way that the engine speed is held as low as possible, even at high driving speeds. Another aim is to keep down the masses which co-rotate under no load in order thereby to effect a further reduction in emissions.

In a conventional design, a large number of gears necessarily implies a relatively large number of transmission gearwheels and therefore a relatively large overall length, although this is not desired in modern motor vehicle engineering, as well as a relatively high weight of the transmission and relatively high associated power losses.

Known transmissions of the type stated at the outset (WO 2012/084250 A1; DE 10 2013 216 387 A1) are therefore already taking a step in the desired direction by providing the possibility of the power flowing both via a gearwheel stage associated with the first transmission input shaft and via a gearwheel stage associated with the second transmission input shaft.

In the case of such dual clutch transmissions, the transmission input shafts are designed as an inner shaft and an outer shaft, wherein the inner shaft and the outer shaft can be driven selectively. The additionally selected gears can then be routed along an indirect path which runs via gearwheels that are arranged on the respective un-driven transmission input shaft.

These known dual clutch transmissions, by means of which it is possible, in addition to the existing gearwheel pairs and the gears that result therefrom, to select further gears, require hollow shaft devices for this purpose on the intermediate shafts and, in some cases, also on the transmission input shafts, on which hollow shaft devices in each case at least two gearwheels are arranged, wherein the hollow shafts co-rotate freely on the transmission input shafts and intermediate shafts but can be connected thereto for conjoint rotation when required.

SUMMARY

The use of such hollow shaft arrangements represents not only a high additional weight contribution but also leads to an increase in overall lengths and overall heights and to poorer efficiency of the transmission.

It is therefore the underlying object of the invention to provide a dual clutch transmission which allows a large number of gears without enlarging the dimensions of the transmission and without significantly increasing the weight thereof.

According to the invention, this object is achieved by virtue of the fact that an additional intermediate gearwheel set is provided, that one gearwheel of the intermediate gearwheel set is seated on the first or second intermediate shaft, that the other gearwheel of the intermediate wheel set is arranged on a third intermediate shaft, and that a third output gearwheel, which meshes with one of the output gearwheels of the first or second intermediate shaft, is seated on the third intermediate shaft.

The intermediate gearwheel set can be selectively combined with all the gears, wherein the intermediate gearwheel set acts as a multiplier, i.e. the gears that can be selected via the first and/or second intermediate shaft can be doubled by means of the intermediate gearwheel set and the intermediate shaft. Thus, the third output gearwheel seated on the third intermediate shaft then meshes with one of the two output gearwheels of the first or second intermediate shaft, which gearwheels must co-rotate freely on the intermediate shafts thereof in this position in order to avoid producing an interlock between the third output gearwheel and the first or second output gearwheel.

It is preferable if all the gearwheels arranged on the first and second intermediate shafts are designed as freely rotating wheels, wherein at least the coupling devices provided for the output gearwheels of the first and second intermediate shafts are of double-acting design.

By means of this coupling device, it is thus possible for both the corresponding output gearwheel and the gearwheel adjacent to the output gearwheel to be connected for conjoint rotation to the corresponding intermediate shaft, or both adjacent gearwheels can be released in an intermediate position in order to co-rotate freely.

When the power flows via the third intermediate shaft, the output gearwheels of the first intermediate shaft and of the second intermediate shaft must be decoupled and co-rotate freely on the respective intermediate shaft thereof.

It is expedient if the gearwheel of the additional intermediate gearwheel set which is seated on the first intermediate shaft or the second intermediate shaft can be selectively connected for conjoint rotation to the intermediate shaft thereof or released therefrom.

As an alternative, however, it is also possible for the third output gearwheel, which is arranged on the third intermediate shaft, to be selectively connected for conjoint rotation to the third intermediate shaft or released therefrom by means of a coupling device.

The transmission according to the invention may have four wheel sets and one intermediate wheel set.

If the transmission is provided with four wheel sets, for example, at least five coupling devices should be provided.

In a preferred illustrative embodiment of the transmission having four wheel sets, there are six coupling devices.

Eleven forward gears and two reverse gears can be selected by means of the transmission according to the invention.

The 1st, 2nd, 9th and 11th forward gears can pass as winding path gears via the first intermediate shaft and the second intermediate shaft.

The 3rd, 6th, 7th and 8th forward gears can expediently be selected as basic gears via the first intermediate shaft or the second intermediate shaft.

The 4th and 5th forward gear can, in turn, be selected as winding path gears via the first or second intermediate shaft and via the third intermediate shaft.

The 10th forward gear can, in turn, be selected as a winding path gear via the first intermediate shaft and the second intermediate shaft in combination with the third intermediate shaft.

The two reverse gears are selected as winding path gears via the first intermediate shaft and the second intermediate shaft.

BRIEF DESCRIPTION OF THE DRAWINGS

The invention is illustrated by way of example in the drawing and described below in detail with reference to the drawing, in which:

FIG. 15: shows a tabular summary of the shift pattern for eleven forward gears and two reverse gears.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
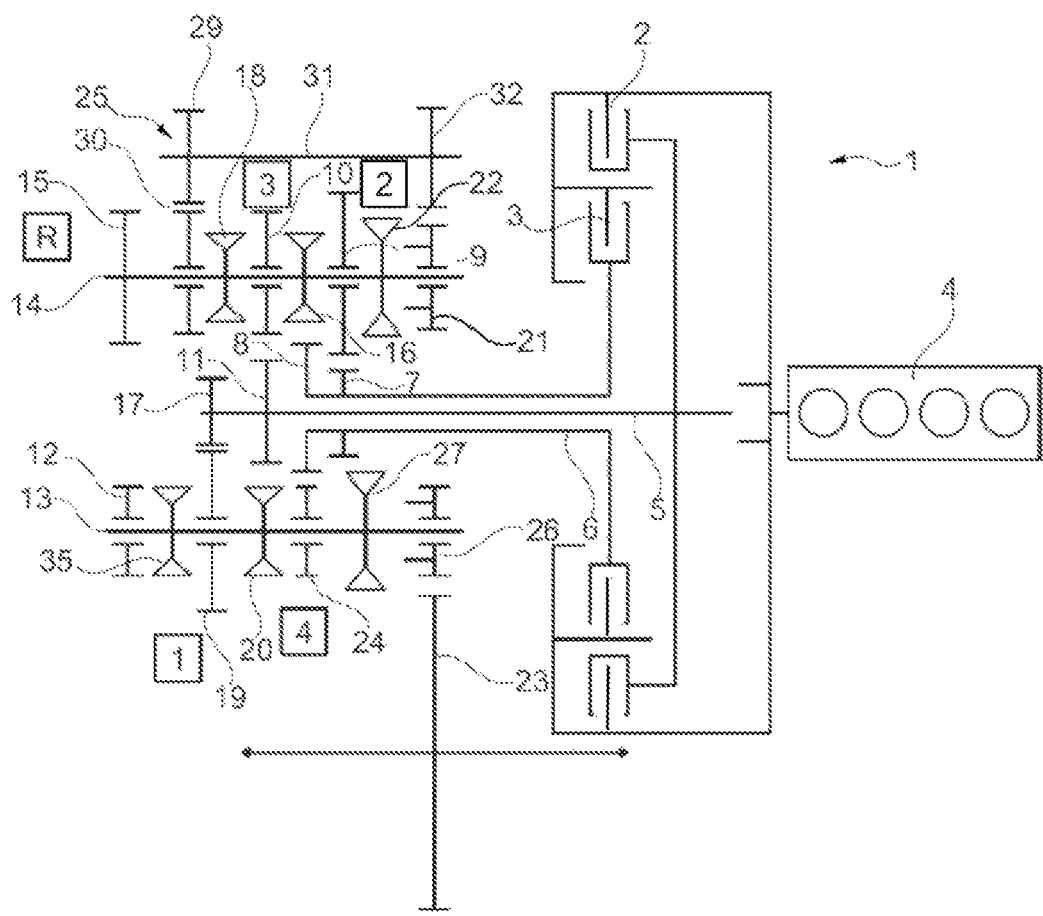
FIG. 1: shows an illustrative embodiment of the dual clutch transmission according to the invention.

The dual clutch transmission 1 illustrated in FIG. 1 comprises four wheel sets for the forward gears, which are provided with numbers 1 to 4 enclosed by square borders, and a wheel set "R" for the reverse gears. In addition, two friction clutches 2 and 3 known per se are provided, said clutches transmitting the power flow supplied by an engine 4 selectively to two transmission input shafts. The transmission input shafts are designed as an inner shaft 5 and an outer shaft 6, wherein the inner shaft 5 extends coaxially through the outer shaft 6.

The inner shaft 5 projects by a certain amount from the outer shaft 6 within the transmission case (not shown in the drawing), wherein two gearwheels 11 and 17 connected for conjoint rotation to the inner shaft 5 are arranged on the end of the inner shaft 5 which projects from the outer shaft 6. Two further gearwheels 7 and 8 are likewise arranged for conjoint rotation on the outer shaft 6.

A first intermediate shaft 13 and a second intermediate shaft 14 are furthermore provided, on which shafts gearwheels are likewise arranged. The gearwheels arranged on the intermediate shafts 13 and 14 are rotatably mounted on the intermediate shafts 13, 14 and can be connected for conjoint rotation to the intermediate shafts 13 and 14 by means of coupling devices according to the selection of the desired gear.

Four gearwheels are rotatably mounted on the first intermediate shaft 13, namely a gearwheel 24, which is in engagement with the gearwheel 8 arranged on the outer shaft 6, a gearwheel 19, which meshes with the gearwheel 17 seated on the inner shaft 5, and a gearwheel 12 for the reverse gear, which is in engagement with a gearwheel 15 seated for conjoint rotation on the second intermediate shaft 14.

An output gearwheel 26, which is in engagement with the differential gearwheel 23, is seated on the first intermediate shaft 13, on the right-hand side in the drawing.

Three coupling devices 27, 20 and 35, which are of double-acting design, are arranged between these four gearwheels 12, 19, 24 and 26 mounted rotatably on the first intermediate shaft 13. Three shift positions are possible for these three coupling devices, namely to the right, to the left and in a central zero position, in which none of the loosely arranged adjacent gearwheels on both sides are coupled.

Situated on the second intermediate shaft 14 is the gearwheel 15 already mentioned, which is arranged at the left-hand end of the second intermediate shaft 14, a gearwheel 10, which is in engagement with the gearwheel 11 arranged for conjoint rotation on the inner shaft 5, and another rotatably mounted gearwheel 9, which meshes with the gearwheel 7 arranged for conjoint rotation on the outer shaft 6.

At the right-hand end of the second intermediate shaft 14 there is an output gearwheel 21, which, like the output gearwheel 26 arranged on the first intermediate shaft 13, meshes with the differential gearwheel 23.

Also provided is an additional intermediate gearwheel set 25, of which one gearwheel 30 is seated on the second intermediate shaft 14 and another gearwheel 29 is seated on a third intermediate shaft 31. While the gearwheel 29 arranged on the third intermediate shaft 31 is connected for conjoint rotation to the third intermediate shaft 31, the gearwheel 30 of the intermediate gearwheel set 25 is mounted rotatably on the second intermediate shaft 14.

Arranged between the gearwheels 21, 9, 10, 21 and 30 mounted rotatably on the second intermediate shaft 14 there is in each case a coupling device 18, 16 and 22, which, like the coupling devices arranged on the first intermediate shaft 13, is of double-acting design. Thus, for example, the output gearwheel 21 arranged on the second intermediate shaft 14 can be connected for conjoint rotation or released by means of coupling device 22. The same applies to the adjacent gearwheel 9, which can likewise be connected for conjoint rotation to the second intermediate shaft 14 by means of coupling device 22 or is released in the decoupled state. In the central position of the coupling device 22, both gearwheel 9 and the output gearwheel 21 are rotatable and can co-rotate freely. Corresponding statements apply to coupling devices 16 and 18 and the gearwheels dependent thereon.

In addition to the gearwheel 29 arranged in a fixed manner, a third output gearwheel 32 is provided on the third intermediate shaft 31, said output gearwheel being positioned for conjoint rotation on the third intermediate shaft 31 in the illustrative embodiment shown in the drawing. The illustrated embodiment of the third intermediate shaft 31 with the two gearwheels 29 and 32 arranged in a fixed manner represents a very simple and uncomplicated embodiment.

As an alternative, it would, of course, also be possible to fix gearwheels 29 and 32 for conjoint rotation or release said gearwheels by means of coupling devices that are not shown in the drawing. In this case, the gearwheel 30 of the intermediate gearwheel set 25 which is seated on the second intermediate shaft 14 could then be connected for conjoint rotation to its intermediate shaft 14. In some circumstances, it might then be possible to dispense with coupling device 18.

By means of the transmission illustrated in FIG. 1, it is possible to select eleven forward gears and two reverse gears, wherein the gears can in some cases be selected as simple basic gears, in some cases as basic gears via the third intermediate shaft 31 or in some cases as winding path gears via more than one intermediate shaft.

In the following FIGS. 2 to 14, the individual selected gears are illustrated, wherein the power flow has in each case been made clear by depicting the participating shafts, gearwheels and coupling devices in thick lines, while the inactive transmission components are illustrated in the form of thin lines.

Figure 2:
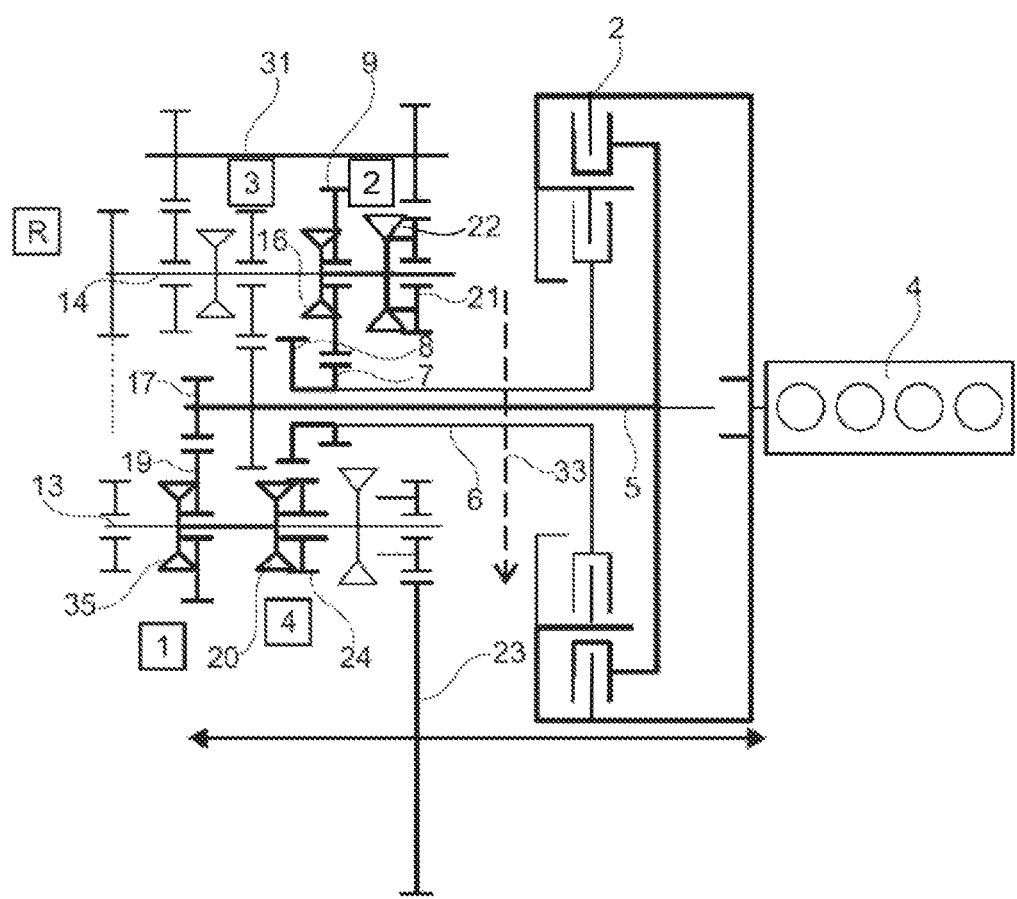
FIG. 2: shows the shift pattern for the 1st gear.

FIG. 2 illustrates the $1^{st}$ gear, which is selected as a winding path gear. The power flow passes from the engine 4, via friction clutch 2 and the inner shaft 5, wherein the gearwheel 17 seated at the left-hand end of the inner shaft 5 meshes with gearwheel 19, which is seated on the first intermediate shaft 13 and is connected for conjoint rotation to the first intermediate shaft 13 by means of coupling device 35.

Gearwheel 24, which is likewise seated on the first intermediate shaft 13 and which meshes with gearwheel 8, which is seated on the outer shaft 6, is connected for conjoint rotation to the first intermediate shaft 13 by means of coupling device 20 and thus transmits the torque to the freely corotating outer shaft 6 via gearwheel 8. Gearwheel 7, which is likewise seated on the outer shaft 6 and is connected for conjoint rotation thereto, transmits the torque to gearwheel 9, which is seated on the second intermediate shaft 14 and which is connected for conjoint rotation to the second intermediate shaft 14 by means of coupling device 16.

Output gearwheel 21, which is likewise seated on the second intermediate shaft 14, is likewise connected for conjoint rotation to the second intermediate shaft 14 by means of coupling device 22 and consequently transmits the power flow to the differential gearwheel 23, as indicated by the dashed arrow 33.

Figure 3:
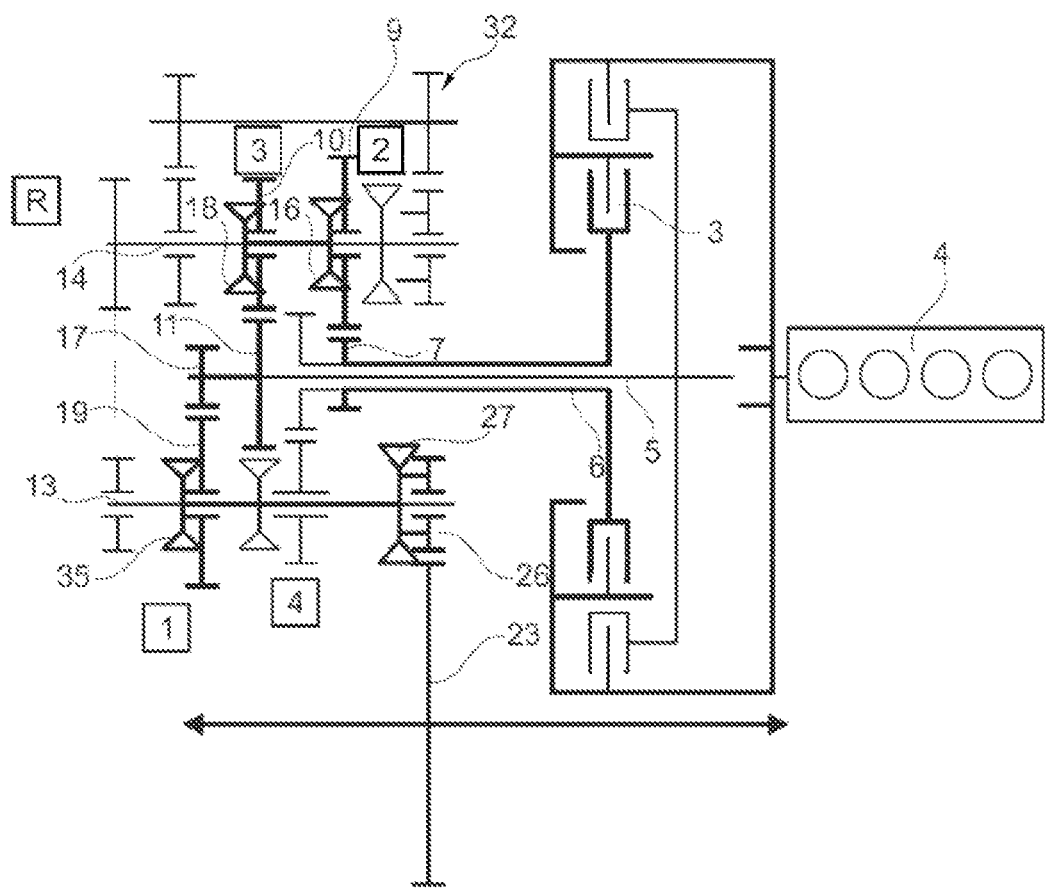
FIG. 3: shows the shift pattern for the 2nd gear.

FIG. 3 illustrates the selection of the $2^{nd}$ gear, which once again passes as a winding path gear via the two intermediate shafts 13 and 14.

In this shift position, the power flow is transmitted from the engine 4 to the outer shaft 6 via friction clutch 3. In this case, gearwheel 7, which is seated on the outer shaft 6, meshes with gearwheel 9, which is seated on the second intermediate shaft 14 and which is connected for conjoint rotation to the second intermediate shaft 14 by means of coupling device 16 and thereby drives the intermediate shaft 14.

Gearwheel 10, which is likewise seated on the second intermediate shaft 14 and which, like gearwheel 9, is connected for conjoint rotation to the second intermediate shaft 14, by means of coupling device 18, meshes with gearwheel 11, which is seated on the freely corotating inner shaft 5 and which thereby drives the inner shaft 5. Here, gearwheel 17, which is furthermore seated on the inner shaft 5, meshes with gearwheel 19, which is seated on the first intermediate shaft 13 and which is connected for conjoint rotation to the first intermediate shaft 13 by means of coupling device 35, whereby the first intermediate shaft 13 is driven.

In this shift position, output gearwheel 26, which is seated on the first intermediate shaft 13, is connected for conjoint rotation to the first intermediate shaft 13 by means of coupling device 27 and thus transmits the torque of the first intermediate shaft 13 to the differential gearwheel 23.

Figure 4:
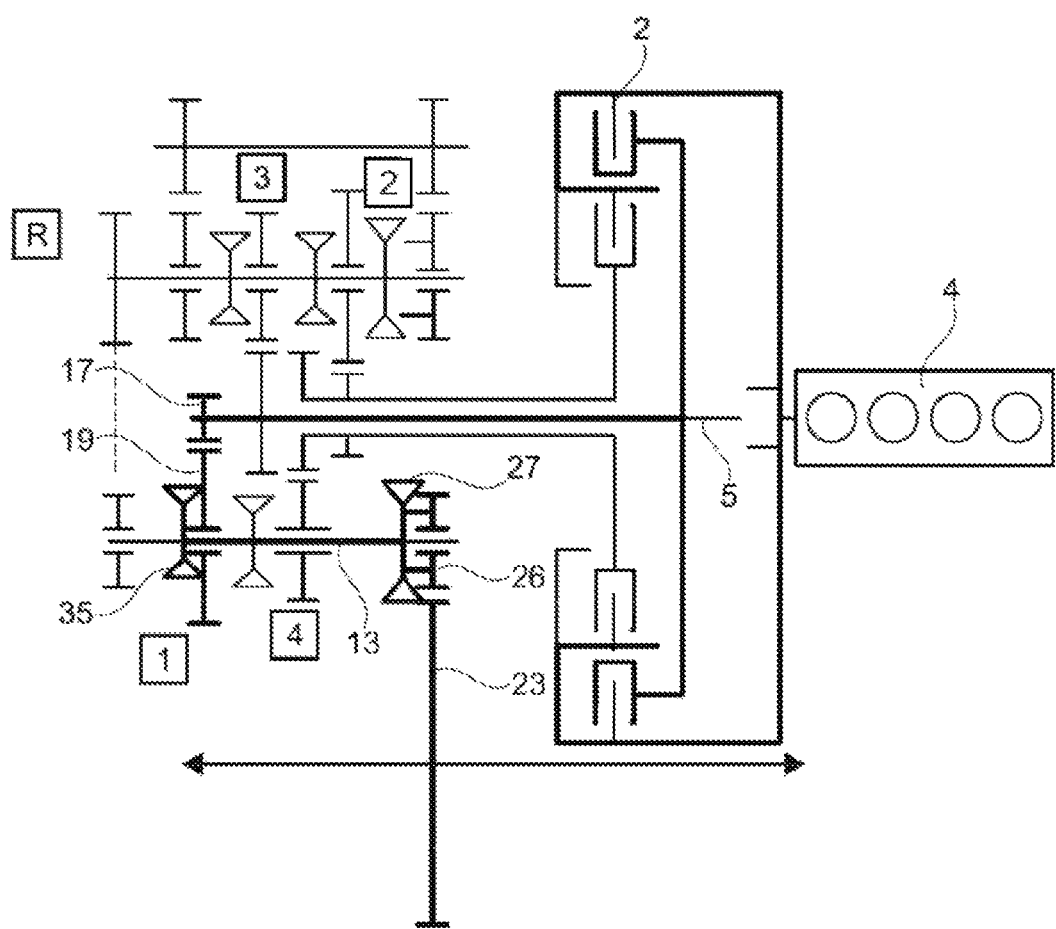
FIG. 4: shows the shift pattern for the 3rd gear.

FIG. 4 illustrates the shift position for the $3^{rd}$ gear, which can be selected as a simple basic gear. In this case, the power flow coming from the engine 4 is transmitted by friction clutch 2 to the inner shaft 5 and, from there, via gearwheel 17, which is seated at the left-hand end of the inner shaft 5, to gearwheel 19, which is seated on the first intermediate shaft 13 and which is connected for conjoint rotation to the first intermediate shaft 13 by means of coupling device 35. In this shift position, the output gearwheel 26, which is also seated on the first intermediate shaft 13, is connected for conjoint rotation to the first intermediate shaft 13 by means of coupling device 27, with the result that the power flow is transmitted directly from the output gearwheel 26 to the differential gearwheel 23.

Figure 5:
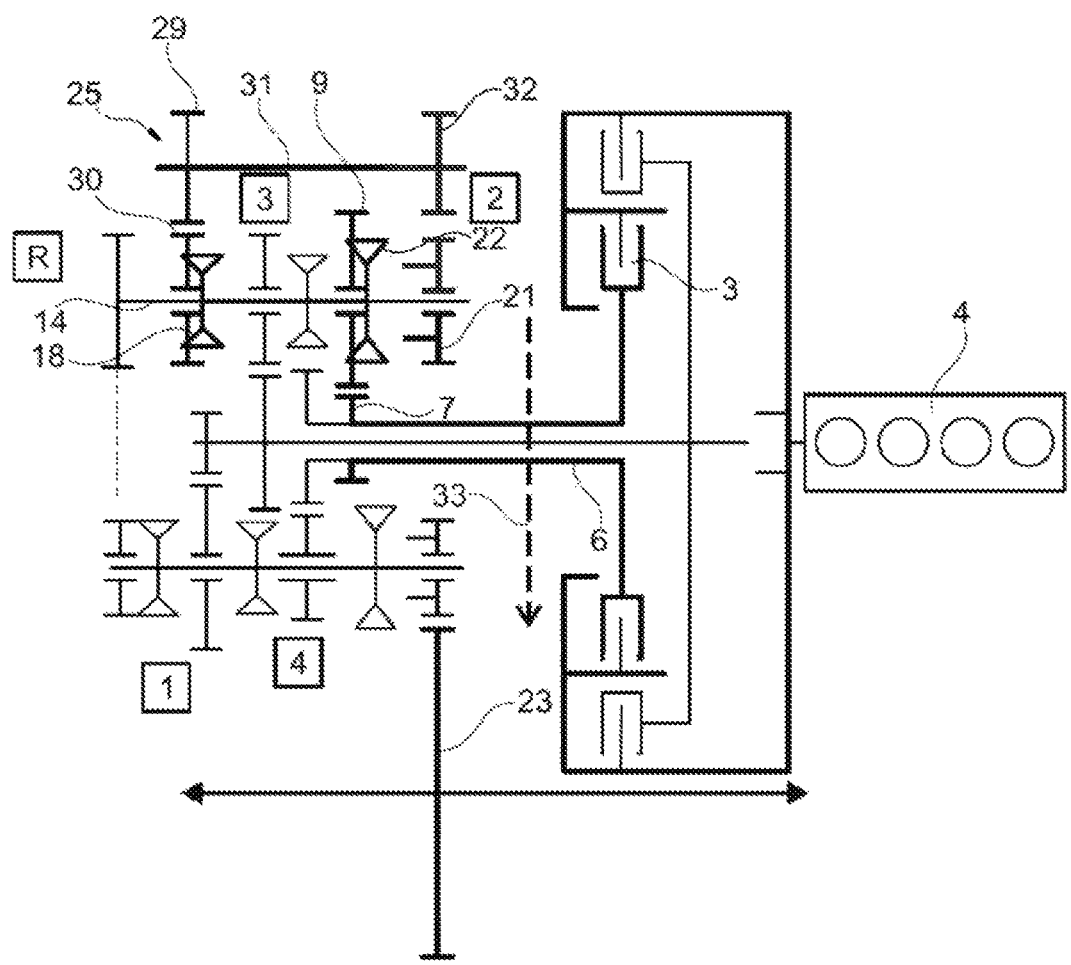
FIG. 5: shows the shift pattern for the 4th gear.

FIG. 5 illustrates the shift position of the $4^{th}$ gear. The $4^{th}$ gear is once again a basic gear but involves the intermediate gearwheel set 25.

The power flow starting from the engine 4 is transmitted via friction clutch 3 to the outer shaft 6 and, from there, via gearwheel 7, to gearwheel 9, which is seated on the second intermediate shaft 14 and which is connected for conjoint rotation to the second intermediate shaft 14 by means of coupling device 22. From the second intermediate shaft 14, the power flow is then transmitted via the intermediate gearwheel set 25 to the third intermediate shaft 31, namely via gearwheel 30, which is connected for conjoint rotation to the second intermediate shaft 14 by means of coupling device 18 and transmits the torque via gearwheel 29 to the third intermediate shaft 31.

In this case, the third output gearwheel 32, which is seated in a fixed manner on the third intermediate shaft 31, meshes with output gearwheel 21, which is seated loosely on the second intermediate shaft 14 and which transmits the power flow from the third intermediate shaft 31 to the differential gearwheel 23, as indicated by the dashed arrow 33.

Figure 6:
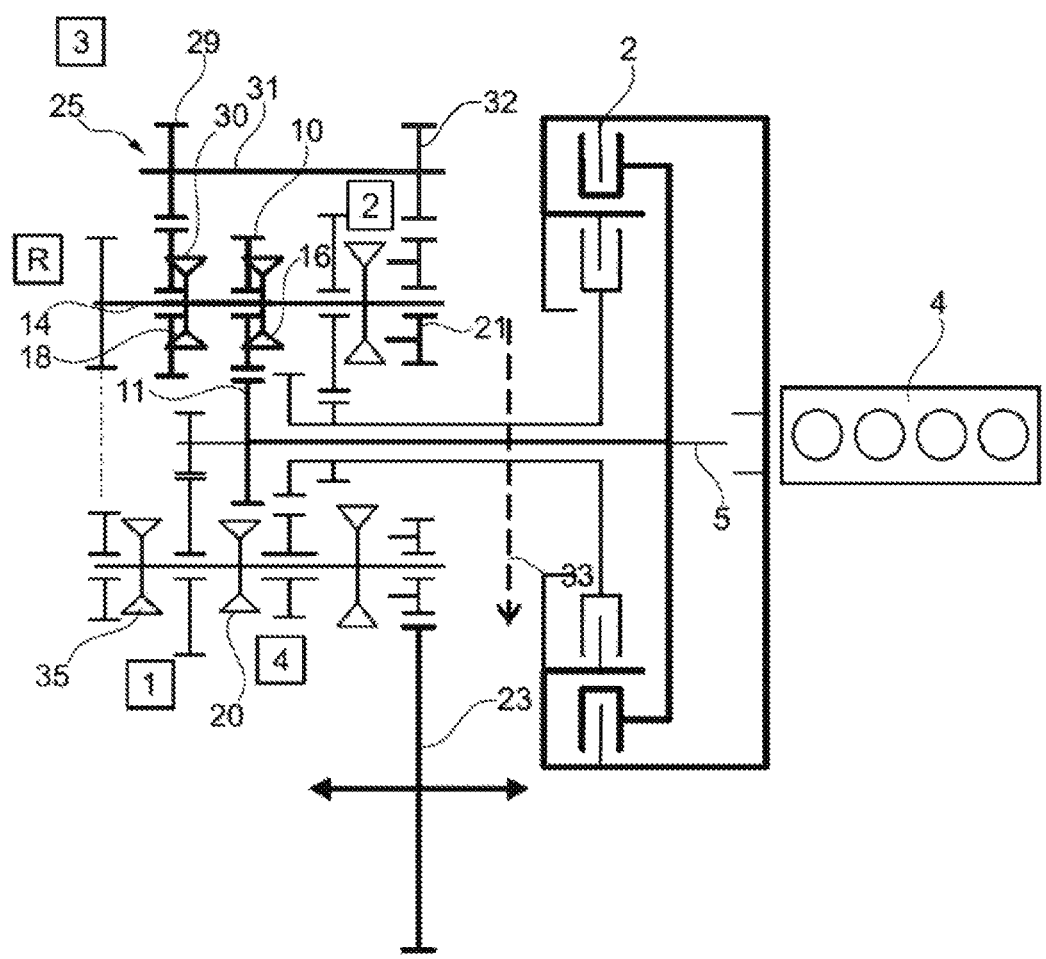
FIG. 6: shows the shift pattern for the 5th gear.

FIG. 6 shows the shift pattern of the $5^{th}$ gear, which is once again a basic gear involving the intermediate gearwheel set 25.

In this case, the power flow is transmitted from the engine 4 to the inner shaft 5 via friction clutch 3. Here, gearwheel 11, which is seated on the inner shaft 5, meshes with gearwheel 10, which is seated on the second intermediate shaft 14 and which is connected for conjoint rotation to the second intermediate shaft 14 by means of coupling device 16.

From the second intermediate shaft 14, the power flow passes via the intermediate gearwheel set 25 to the third intermediate shaft 31, more specifically, during this process, gearwheel 30, which is seated on the second intermediate shaft 14 is connected for conjoint rotation to the second intermediate shaft 14 by means of coupling device 18 and transmits its torque to the third intermediate shaft 31 via gearwheel 29. Here, output gearwheel 32, which is seated in a fixed manner on the third intermediate shaft 31 meshes with output gearwheel 21, which is seated loosely on the second intermediate shaft 14 and which meshes with the differential gearwheel 23, as indicated by the dashed arrow 33.

Figure 7:
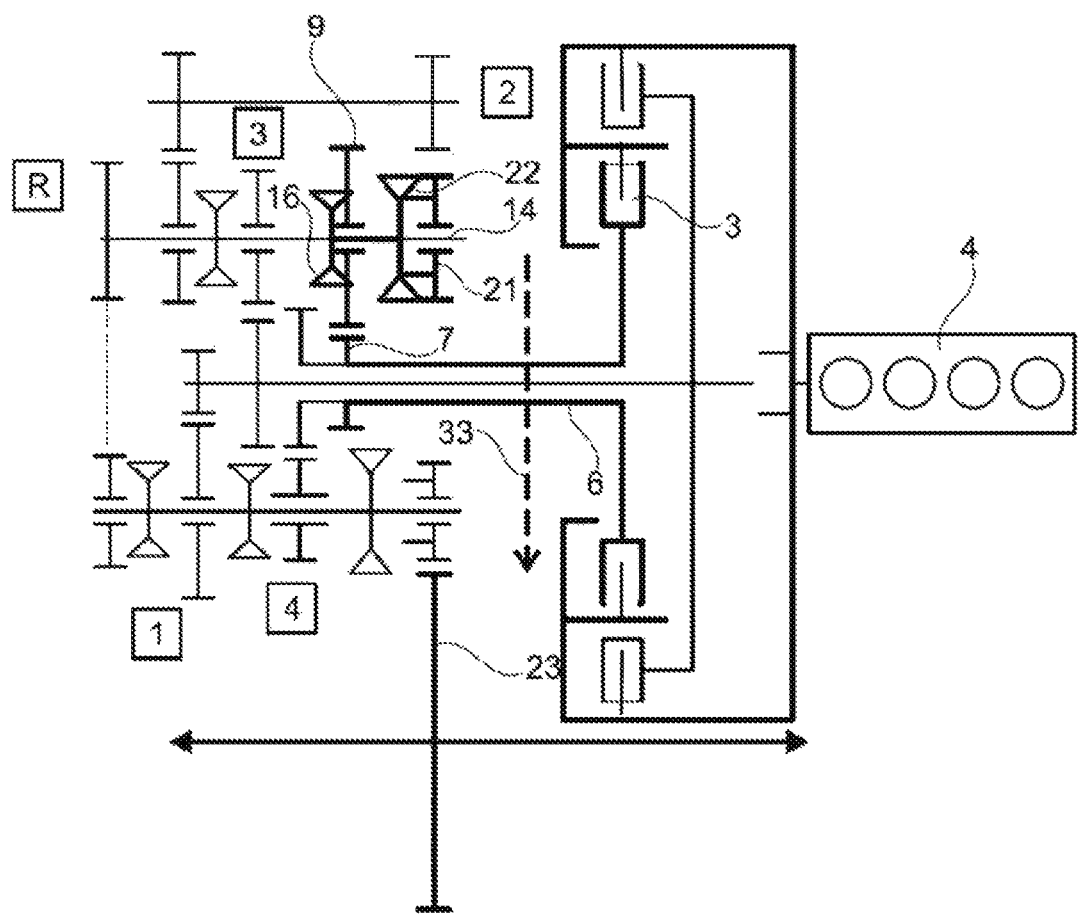
FIG. 7: shows the shift pattern for the 6th gear.
Figure 8:
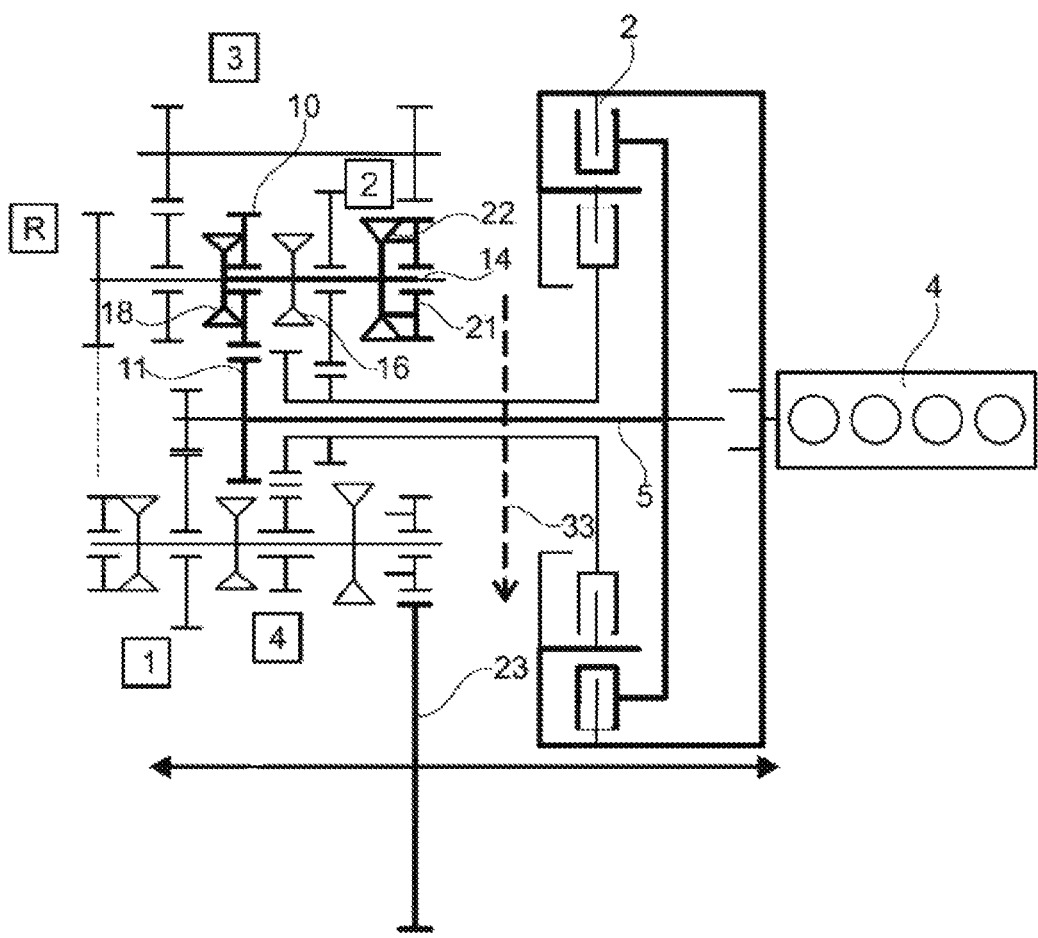
FIG. 8: shows the shift pattern for the 7th gear.

FIG. 7 illustrates the shift pattern of the $6^{th}$ gear, which is once again selected as a simple basic gear. Here, the power flow passes from the engine 4 via friction clutch 3 to the outer shaft 6 and, from there, via gearwheel 7 and gearwheel 9, which meshes with the latter, to the second intermediate shaft 14. Here, gearwheel 9 is connected for conjoint rotation to the second intermediate shaft 14 by means of coupling device 16. In the same way, output gearwheel 21, which is seated on the second intermediate shaft 14, is connected for conjoint rotation to the second intermediate shaft 14 by means of coupling device 22 and transmits the power flow directly to the differential gearwheel 23, as indicated by the dashed arrow 33.

The shift pattern of the $7^{th}$ gear, which is illustrated in FIG. 8, once again corresponds to a simple basic gear, wherein the power flow passes from the engine 4 to the inner shaft 5 via friction clutch 2. From gearwheel 11, which is arranged for conjoint rotation on the inner shaft 5, the power flow passes to the second intermediate shaft 14, more specifically gearwheel 11 on the inner shaft 5 meshes with gearwheel 10 on the second intermediate shaft 14, wherein gearwheel 10 is connected for conjoint rotation to the second intermediate shaft 14 by means of coupling device 18. The second output gearwheel 21, which is seated on the second intermediate shaft 14, is connected for conjoint rotation to the second intermediate shaft 14 by means of coupling device 22 and once again transmits its torque directly to the differential gearwheel 23, as indicated by the dashed arrow 33.

Figure 9:
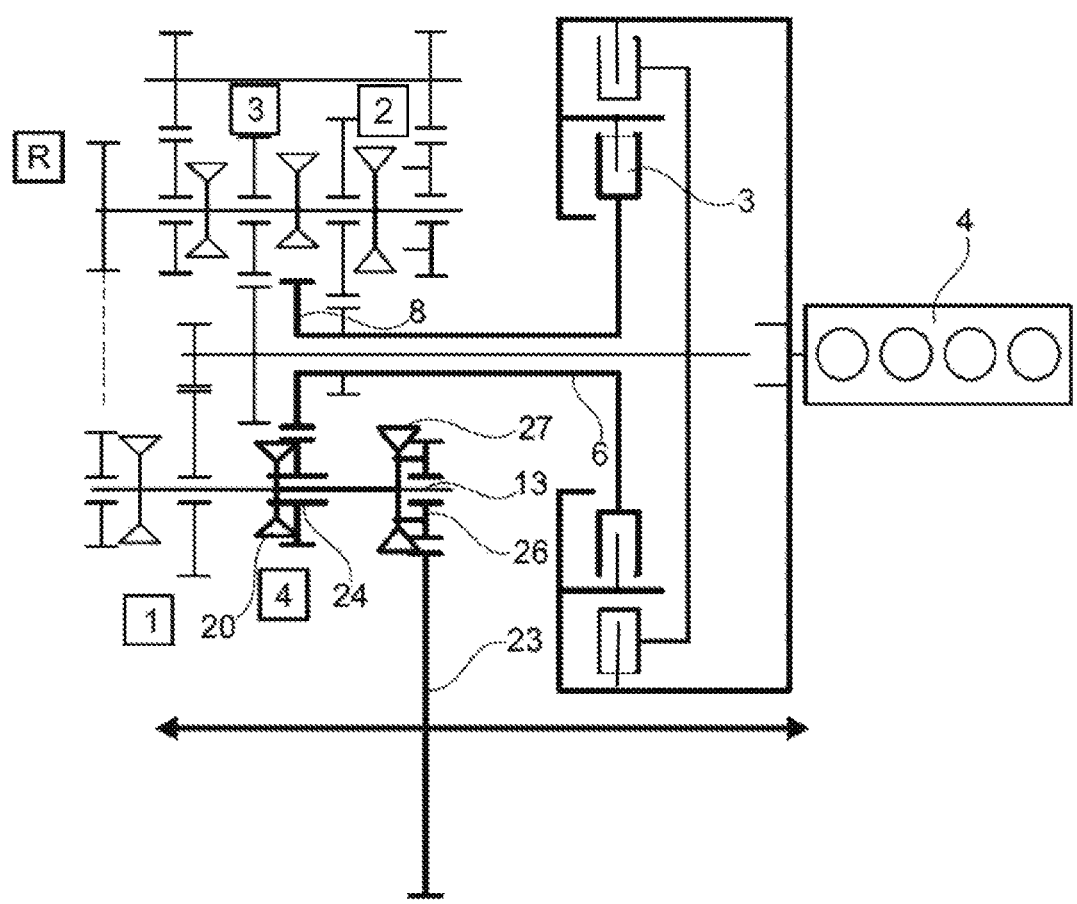
FIG. 9: shows the shift pattern for the 8th gear.

FIG. 9 illustrates the shift pattern of the $8^{th}$ gear, which can once again be selected as a simple basic gear, more specifically the power flow passes from the engine 4 to the outer shaft 6 via friction clutch 3. In this case, gearwheel 8, which is seated for conjoint rotation at the left-hand end of the outer shaft 6, meshes with gearwheel 24, which is seated on the first intermediate shaft 13 and which is connected for conjoint rotation to the first intermediate shaft 13 by means of coupling device 20.

Output gearwheel 26, which is seated on the first intermediate shaft 13, is likewise connected for conjoint rotation to the first intermediate shaft 13 by its coupling device 27 and thus transmits the torque directly to the differential gearwheel 23.

Figure 10:
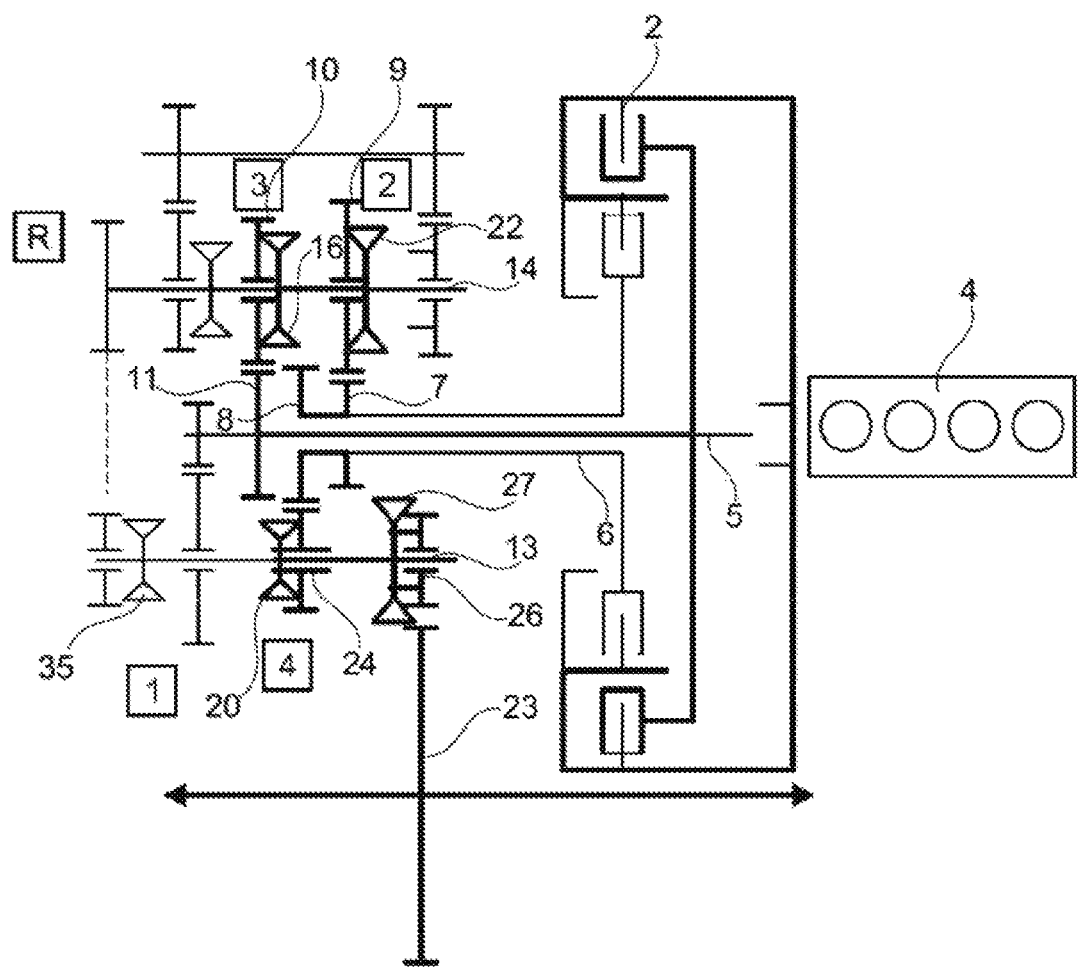
FIG. 10: shows the shift pattern for the 9th gear.

FIG. 10 illustrates the shift pattern of the $9^{th}$ gear, which is selected as a winding path gear, more specifically the power flow passes from the engine 4, via friction clutch 2, to the inner shaft 5, from there, via gearwheel 11, to gearwheel 10, which is seated on the second intermediate shaft 14 and which is connected for conjoint rotation to the second intermediate shaft 14 by means of coupling device 16.

From the second intermediate shaft 14, the power flow is transmitted via gearwheel 9, which is connected for conjoint rotation to the second intermediate shaft 14 by means of coupling device 22, to gearwheel 7 of the outer shaft 6, which in this case idly corotates. Gearwheel 8, which is likewise seated on the outer shaft 6, then transmits the power flow to the first intermediate shaft 13 via gearwheel 24, wherein gearwheel 24 is connected for conjoint rotation to the first intermediate shaft 13 by means of coupling device 20.

In this case, output gearwheel 26, which is seated on the first intermediate shaft 13, is likewise connected for conjoint rotation to the first intermediate shaft 13 by means of coupling device 27, allowing output gearwheel 26 to transmit the torque directly to the differential gearwheel 23.

Figure 11:
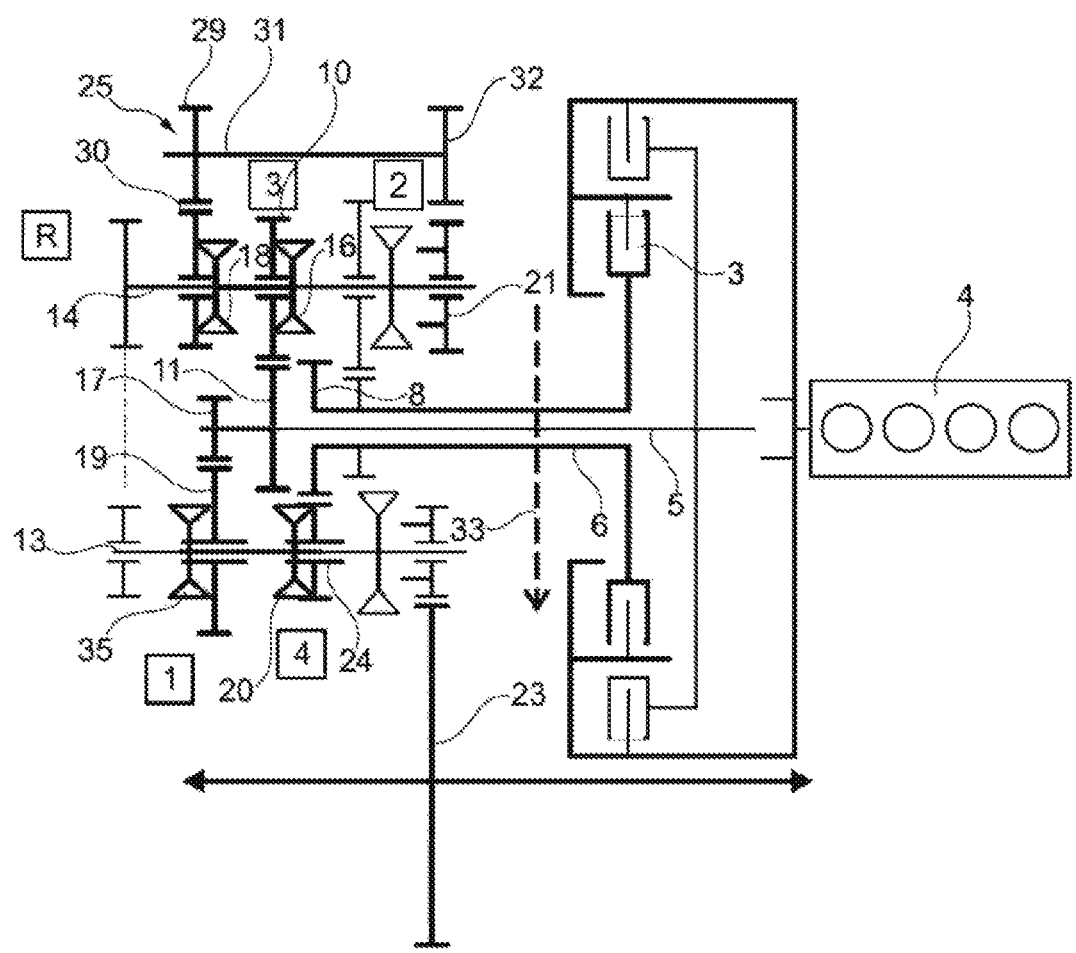
FIG. 11: shows the shift pattern for the 10th gear.
Figure 12:
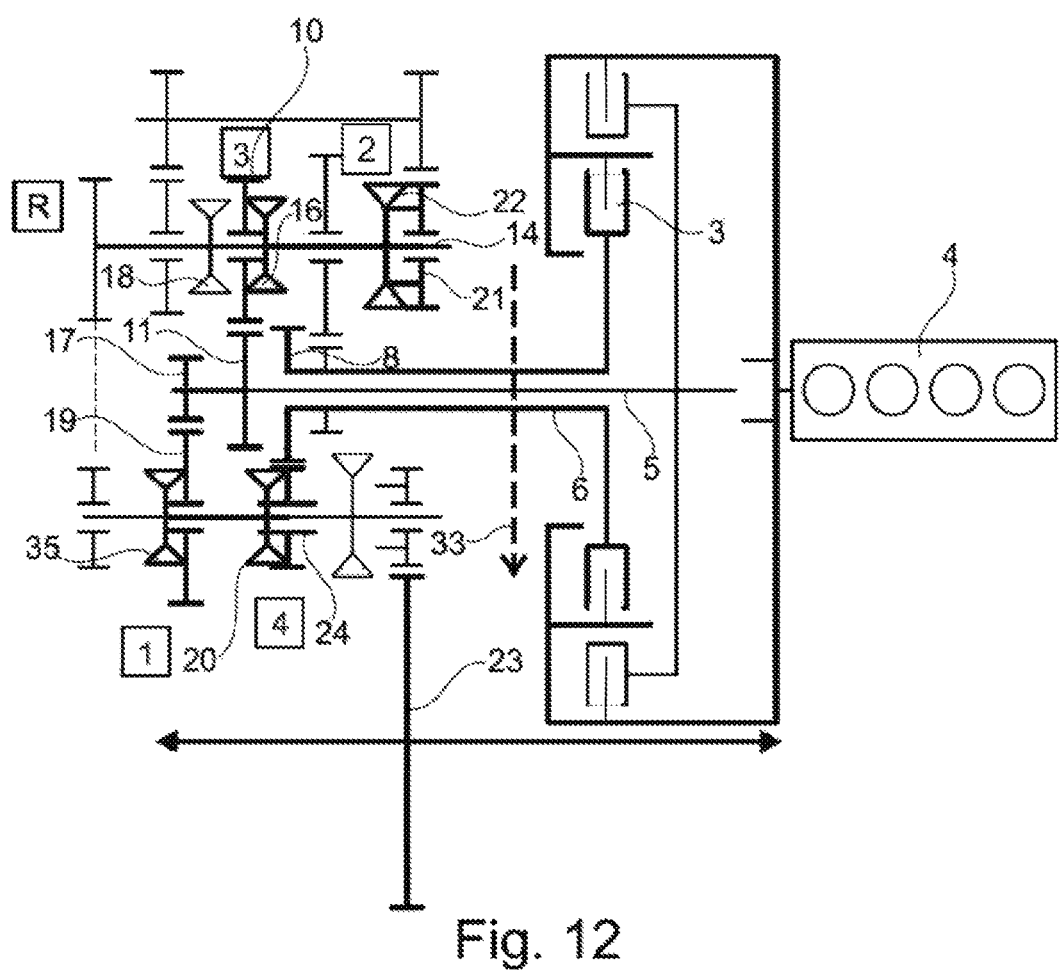
FIG. 12: shows the shift pattern for the 11th gear.

FIG. 11 illustrates the shift pattern for the $10^{th}$ gear, this being a winding path gear involving the intermediate gearwheel set 25.

In this case, the power flow starting from the engine 4 is transmitted to the outer shaft 6 via friction clutch 3. From the outer shaft 6, the power flow passes via gearwheel 8, which is seated at the left-hand end of the outer shaft 6, and coupled gearwheel 24, which is seated on the first intermediate shaft 13, to the first intermediate shaft 13 and, from there, via the coupled gearwheel 19 on said shaft and gearwheel 17, which meshes with the latter gearwheel, of the freely corotating inner shaft 5.

Gearwheel 11, which is likewise seated on the inner shaft 5, transmits the power flow via the coupled gearwheel 10 to the second intermediate shaft 14 and, from there, the power flow passes via the intermediate gearwheel set 25 to the third intermediate shaft 31 since the coupled gearwheel 30 of the second intermediate shaft 14 meshes with gearwheel 29, which is seated for conjoint rotation on the third intermediate shaft 31.

Output gearwheel 32, which is seated at the right-hand end of the third intermediate shaft 31, then transmits the torque to output gearwheel 21, which corotates freely on the second intermediate shaft 14 and which meshes with the differential gearwheel 23, as indicated by the dashed arrow 33.

The $11^{th}$ gear, which is illustrated in FIG. 12, is once again a winding path gear, although it does not involve the intermediate gearwheel set 25.

The power flow passes from the engine 4 via friction clutch 3 to the outer shaft 6, from there, via gearwheel 8, to the coupled gearwheel 24 of the first intermediate shaft 13 and, from there, via the coupled gearwheel 19, to gearwheel 17, which is seated on the freely corotating inner shaft 5, and, from there, the torque is transmitted via gearwheel 11, which is likewise seated on the inner shaft 5, to gearwheel 10, which is connected for conjoint rotation to the second intermediate shaft 14 by means of coupling device 16.

Output gearwheel 21, which is seated on the second intermediate shaft 14 and is connected for conjoint rotation to the second intermediate shaft 14 by means of coupling device 22 then transmits the torque to the differential gearwheel 23, as indicated by the dashed arrow 33.

Figure 13:
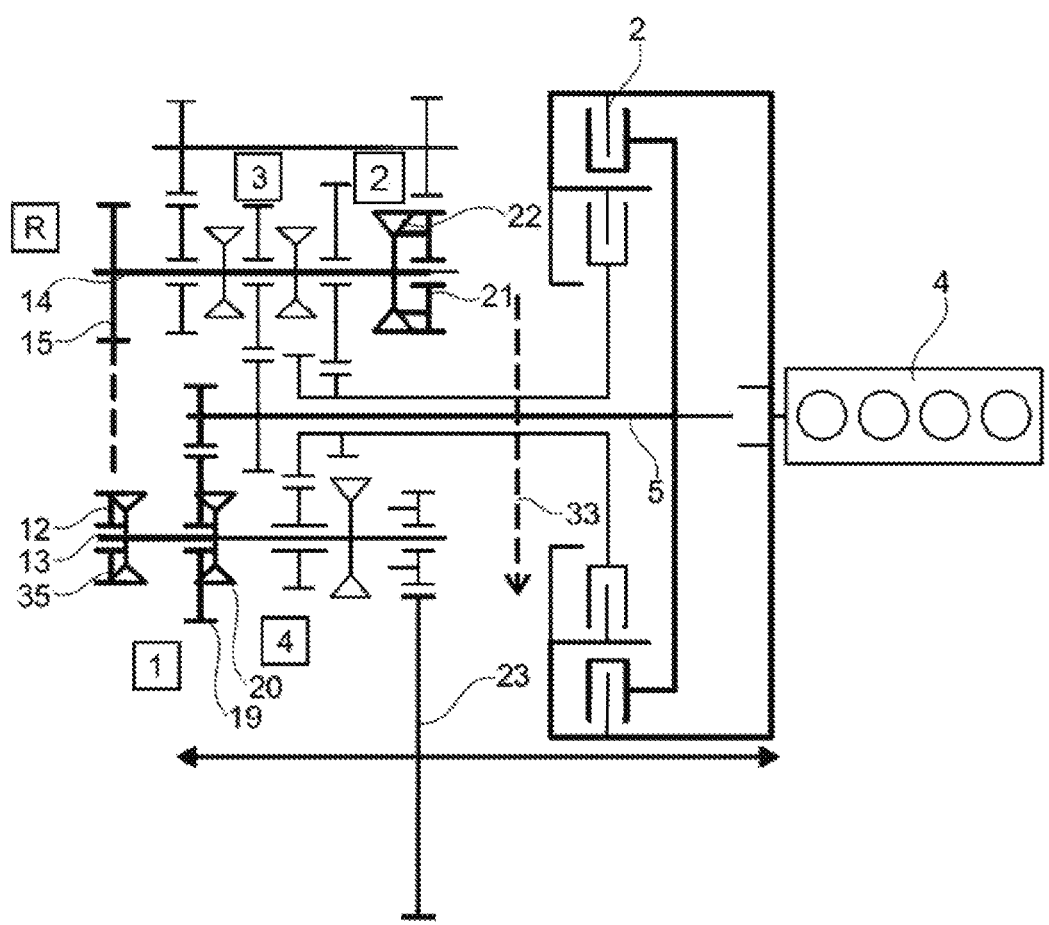
FIG. 13: shows the shift pattern for the 1st reverse gear.
Figure 14:
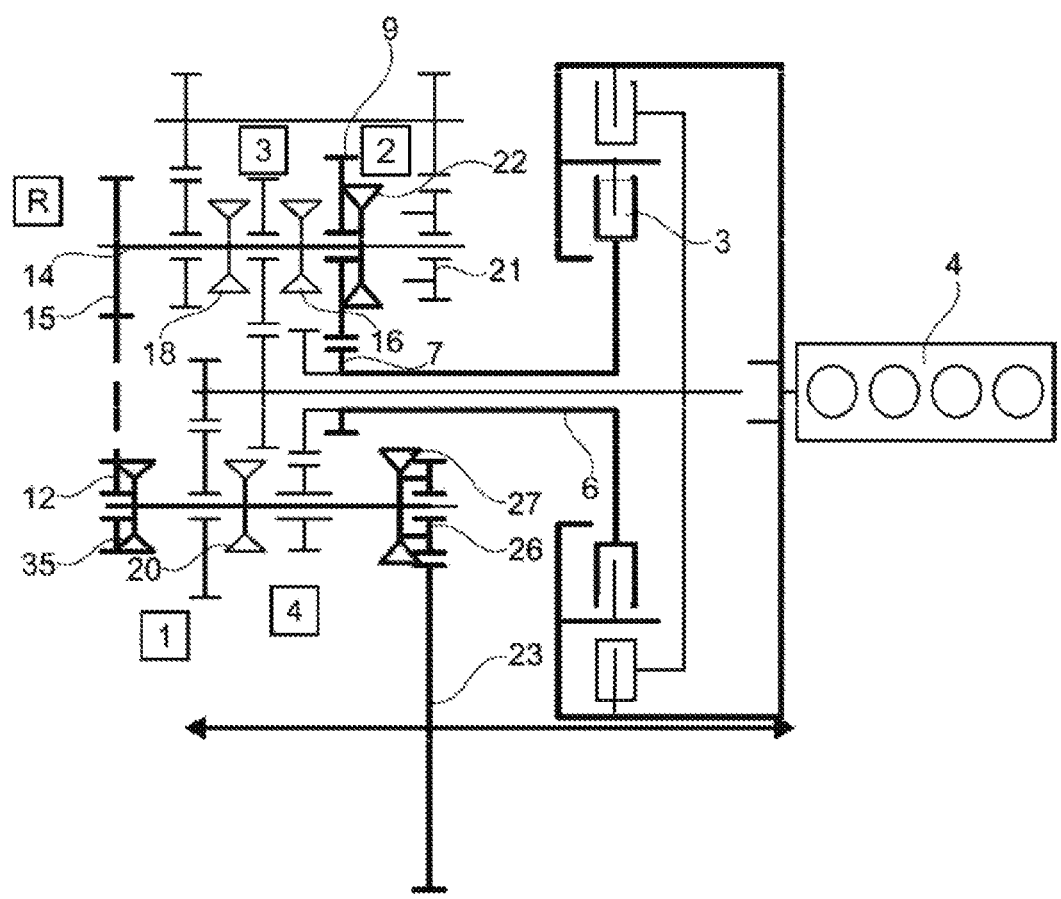
FIG. 14: shows the shift pattern for the 2nd reverse gear.

FIGS. 13 and 14 illustrate the shift patterns of the two reverse gears, which are designed as winding path gears, wherein, according to FIG. 13, the power flow of the first reverse gear passes from the inner shaft 5, via the first intermediate shaft 13 to the second intermediate shaft 14 and, from the second intermediate shaft 14, output gearwheel 21, which is connected for conjoint rotation to the second intermediate shaft 14 by means of coupling device 22, transmits the torque to the differential gearwheel 23, as indicated by the dashed arrow 33.

According to FIG. 14, the power flow passes from the outer shaft 6 to the first intermediate shaft 13 via the second intermediate shaft 14, wherein gearwheel 15, which is seated in a fixed manner on the second intermediate shaft 14, meshes with the coupled gearwheel 12 of the first intermediate shaft 13.

The output gearwheel 26 of the first intermediate shaft 13 is connected for conjoint rotation to the first intermediate shaft 13 by means of coupling device 27 and transmits its torque directly to the differential gearwheel 23.

By means of the transmission according to the invention, which manages with four wheel sets and six coupling devices as well as one intermediate wheel set, it is thus possible to select eleven forward gears and two reverse gears, wherein the total weight of the transmission and the dimensions thereof can be kept extremely small.

FIG. 15 illustrates once again the shift pattern for all the gears, eleven forward gears and two reverse gears. Here, the two left-hand columns indicate which of the two friction clutches 2 and 3 is closed or open, wherein the number 1 indicates the closed state and the number 0 indicates the open state. In the central area, the shift positions of the six coupling devices are illustrated, wherein the letter "R" is intended to represent the right-hand shift position, the letter "L" is intended to represent the left-hand shift position and "0" is intended to represent the uncoupled shift position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual clutch transmission for motor vehicles comprising:
   first and second input shafts;
   two clutches configured to selectively couple the first input shaft and the second input shaft, respectively, to an engine;
   first and second intermediate shafts arranged parallel to the transmission input shafts;
   gearwheel pairs of fixed wheels and freely rotating wheels, of which a first gearwheel is arranged on one of the input shafts and a second gearwheel is arranged on one of the intermediate shafts;
   coupling devices configured to selectively couple the freely rotating wheels to the respective shafts;
   two output gearwheels arranged on each of the two intermediate shafts, respectively, wherein the output gearwheels both mesh with a differential wheel and can each be alternately connected for conjoint rotation to the respective intermediate shaft by one of the coupling devices;
   a third intermediate shaft;
   an intermediate gearwheel set wherein one gearwheel of the intermediate gearwheel set is seated on the second intermediate shaft and meshes with the other gearwheel of the intermediate gearwheel set, the other gearwheel of the intermediate gearwheel set being arranged on the third intermediate shaft; and
   a third output gearwheel seated on the third intermediate shaft and meshing with the output gearwheel of the second intermediate shaft, wherein, when power flows via the third intermediate shaft, the output gearwheels of the first intermediate shaft and the second intermediate shaft are decoupled and co-rotate freely on the respective intermediate shaft thereof.

2. The dual clutch transmission of claim 1 wherein all the gearwheels arranged on the first and second intermediate shafts are designed as freely rotating wheels and at least the coupling devices provided for the output gearwheels of the first and second intermediate shafts are of double-acting design.

3. The dual clutch transmission of claim 1 wherein the gearwheel of the intermediate gearwheel set which is seated on the second intermediate shaft can be selectively connected for conjoint rotation to the second intermediate shaft or released therefrom.

4. The dual clutch transmission of claim 1 wherein the third output gearwheel, which is arranged on the third intermediate shaft, can be selectively connected for conjoint rotation to the third intermediate shaft or released therefrom by means of a coupling device.

5. The dual clutch transmission of claim 1 wherein the transmission has at least four wheel sets and one intermediate wheel set.

6. The dual clutch transmission of claim 5 wherein the transmission has at least five coupling devices.

7. The dual clutch transmission of claim 5 wherein the transmission has six coupling devices.

8. The dual clutch transmission of claim 7 wherein eleven forward gears and two reverse gears can be selected.

9. The dual clutch transmission of claim 8 wherein 1st, 2nd, 9th and 11th forward gears pass as winding path gears via both the first and second intermediate shafts.

10. The dual clutch transmission of claim 9 wherein 3rd, 6th, 7th and 8th forward gears can be selected as basic gears via the first intermediate shaft or the second intermediate shaft.

11. The dual clutch transmission of claim 10 wherein 4th and 5th forward gears can be selected as winding path gears via the first or second intermediate shaft and via the third intermediate shaft.

12. The dual clutch transmission of claim 11 wherein a 10th forward gear can be selected as a winding path gear via the first intermediate shaft, the second intermediate shaft, and the third intermediate shaft.

13. The dual clutch transmission of claim 8 wherein the two reverse gears can be selected as winding path gears via the first intermediate shaft and the second intermediate shaft.

* * * * *